United States Patent
Broadbent et al.

(10) Patent No.: US 12,515,832 B2
(45) Date of Patent: Jan. 6, 2026

(54) METHOD, DEVICE AND SYSTEM FOR FILLING PHARMACEUTICAL CONTAINERS

(71) Applicant: VANRX PHARMASYSTEMS INC., Burnaby (CA)

(72) Inventors: Nick Broadbent, Vancouver (CA); Jeroen Immerzeel, Squamish (CA); Christopher Procyshyn, Surrey (CA); Ross M. Gold, North Vancouver (CA); Steve Sang Joon Park, Toronto (CA)

(73) Assignee: VANRX PHARMASYSTEMS INC., Burnaby (CA)

(*) Notice: Subject to any disclaimer, the term of this patent is extended or adjusted under 35 U.S.C. 154(b) by 3 days.

(21) Appl. No.: 18/412,182

(22) Filed: Jan. 12, 2024

(65) Prior Publication Data
US 2024/0150050 A1    May 9, 2024

Related U.S. Application Data

(60) Continuation-in-part of application No. 17/891,347, filed on Aug. 19, 2022, now Pat. No. 12,172,792, (Continued)

(51) Int. Cl.
*B65B 7/16* (2006.01)
*B65B 3/00* (2006.01)
(Continued)

(52) U.S. Cl.
CPC .............. *B65B 7/161* (2013.01); *B65B 3/003* (2013.01); *B65B 7/2821* (2013.01); (Continued)

(58) Field of Classification Search
CPC . B65D 25/108; B65D 51/241; B01L 3/50853; A61M 5/008; B65B 31/027; B65B 7/2821; B65B 7/161
See application file for complete search history.

(56) References Cited

U.S. PATENT DOCUMENTS

| 649,012 A | 5/1900 | Tapscott |
| 726,505 A | 4/1903 | Burkman |

(Continued)

FOREIGN PATENT DOCUMENTS

| CN | 2010829899 A | 5/2010 |
| CN | 20102514746 | 9/2010 |

(Continued)

OTHER PUBLICATIONS

European Extended Search Report (PCT/US14/051223), Date of Mailing; Mar. 13, 2017.
(Continued)

*Primary Examiner* — Joshua G Kotis
(74) *Attorney, Agent, or Firm* — Kevin R. Erdman; Brannon Sowers & Cracraft PC

(57) ABSTRACT

In one general aspect, a method for filling multiple containers with a pharmaceutical product is disclosed, which comprises decontaminating sealed nested materials in a transfer chamber, removing from the sealed nested materials one or both of a container nest holding the multiple containers and a closure nest holding multiple closures, transferring from the transfer chamber to a controlled environment enclosure the removed nest, aseptically filling the containers with the pharmaceutical product, and closing the containers with the multiple closures. The nests are configured to allow multiple closures and containers to be simultaneously aligned concentrically, and closed simultaneously. Spring-loaded retaining structures on the closure nest allow it to releasably retain multiple closures above the corresponding multiple containers. In some embodiments the spring-loaded features are monolithically integrated with the closure nest. The product may be lyophilized in partially sealed containers while the sealing closures are releasably retained by the closure nest.

13 Claims, 8 Drawing Sheets

Related U.S. Application Data which is a continuation of application No. 15/950,480, filed on Apr. 11, 2018, now Pat. No. 11,518,555, which is a division of application No. 14/912,145, filed as application No. PCT/US2014/051223 on Aug. 15, 2014, now Pat. No. 10,781,002.

(60) Provisional application No. 61/867,014, filed on Aug. 16, 2013.

(51) Int. Cl.
| | | |
|---|---|---|
| *B65B 7/28* | (2006.01) | |
| *B65B 55/02* | (2006.01) | |
| *B65D 41/28* | (2006.01) | |
| *B65B 55/04* | (2006.01) | |
| *B65B 55/08* | (2006.01) | |
| *B65B 55/10* | (2006.01) | |
| *B65D 1/02* | (2006.01) | |
| *B65D 51/00* | (2006.01) | |

(52) U.S. Cl.
CPC ............ *B65B 55/027* (2013.01); *B65D 41/28* (2013.01); *B65B 55/04* (2013.01); *B65B 55/08* (2013.01); *B65B 55/10* (2013.01); *B65D 1/0246* (2013.01); *B65D 51/002* (2013.01)

(56) References Cited

U.S. PATENT DOCUMENTS

| | | | |
|---|---|---|---|
| 837,237 A * | 11/1906 | Markland | ............ B65G 59/067 |
| | | | 221/238 |
| 898,458 A | 9/1908 | Goff | |
| 930,145 A | 8/1909 | Brewington | |
| 1,026,404 A | 5/1912 | Merritt | |
| 1,451,351 A | 4/1923 | Doren | |
| 1,751,022 A | 3/1930 | Askey | |
| 2,353,985 A | 7/1944 | Courtland | |
| 2,544,626 A | 3/1951 | Zimmermann | |
| 2,815,630 A | 12/1957 | Fahrenbach | |
| 2,849,848 A | 9/1958 | Ravn | |
| 2,998,686 A | 9/1961 | Raffaele | |
| 3,245,194 A | 4/1966 | Carski | |
| 3,313,088 A | 4/1967 | Chelle | |
| 3,448,556 A | 6/1969 | Taggart | |
| 3,453,804 A | 7/1969 | Bott | |
| 3,491,505 A | 1/1970 | Hasselmann | |
| 3,537,233 A | 11/1970 | Wiegmann | |
| 3,587,846 A * | 6/1971 | Heier | ..................... B65D 71/50 |
| | | | 294/87.2 |
| 3,950,922 A | 4/1976 | Eberhardt | |
| 4,060,911 A | 12/1977 | Weiler | |
| 4,286,389 A | 9/1981 | Ogle | |
| 5,081,822 A | 1/1992 | Boyd | |
| 5,083,416 A | 1/1992 | Schneider | |
| 5,112,574 A | 5/1992 | Horton | |
| 5,129,162 A | 7/1992 | Hemmersbach | |
| 5,185,985 A | 2/1993 | Vetter | |
| 5,314,084 A | 5/1994 | Folta | |
| 5,519,984 A | 5/1996 | Beussink | |
| 5,799,464 A | 9/1998 | Olsson | |
| 5,816,772 A | 10/1998 | Py | |
| 6,106,783 A | 8/2000 | Gamble | |
| 6,109,139 A | 8/2000 | Regester | |
| 6,164,044 A | 12/2000 | Porfano | |
| 6,418,982 B1 | 7/2002 | Zhang | |
| 6,457,299 B1 | 10/2002 | Schwenke | |
| 6,610,252 B2 | 8/2003 | Madril | |
| 6,705,061 B1 | 3/2004 | Porret | |
| 6,719,141 B2 | 4/2004 | Heinz | |
| 6,890,488 B2 | 5/2005 | Mathus | |
| 7,220,590 B2 | 5/2007 | Moritz | |
| 7,428,807 B2 | 9/2008 | Vander | |
| 7,448,493 B2 * | 11/2008 | Wong | ..................... B65D 71/50 |
| | | | 206/427 |
| 8,291,567 B1 | 10/2012 | Keenan | |
| 8,460,622 B2 | 6/2013 | Motadel | |
| 8,714,384 B2 | 5/2014 | Aneas | |
| 8,727,124 B2 | 5/2014 | Franciskovich | |
| 9,079,757 B2 | 7/2015 | Bjork | |
| 9,415,155 B2 | 8/2016 | Togashi | |
| 9,783,328 B2 | 10/2017 | Liversidge | |
| 9,796,489 B2 | 10/2017 | Veile | |
| 11,518,555 B2 | 12/2022 | Broadbent | |
| 2002/0093147 A1 | 7/2002 | Berna | |
| 2004/0256026 A1 | 12/2004 | Py | |
| 2005/0060962 A1 | 3/2005 | Rothbauer et al. | |
| 2005/0194059 A1 | 9/2005 | Py | |
| 2006/0048844 A1 | 3/2006 | Merrill | |
| 2007/0202144 A1 | 8/2007 | Hellerbrand | |
| 2007/0272648 A1 | 11/2007 | Hammamoto | |
| 2008/0184671 A1 | 8/2008 | Fleckenstein et al. | |
| 2008/0216312 A1 | 9/2008 | Williams et al. | |
| 2009/0100802 A1 | 4/2009 | Bush | |
| 2009/0208316 A1 | 8/2009 | Mayer | |
| 2009/0223592 A1 | 9/2009 | Procyshyn | |
| 2009/0274762 A1 | 11/2009 | Willis | |
| 2010/0050575 A1 | 3/2010 | Aneas | |
| 2010/0089862 A1 | 4/2010 | Schmitt | |
| 2010/0224632 A1 | 9/2010 | Aneas | |
| 2011/0030320 A1 | 2/2011 | Blumenstock et al. | |
| 2011/0192756 A1 | 8/2011 | Hill | |
| 2011/0289889 A1 | 12/2011 | Kohanski et al. | |
| 2012/0090268 A1 | 4/2012 | Krauss | |
| 2012/0248057 A1 | 10/2012 | Bogle | |
| 2013/0174520 A1 | 7/2013 | Tessier | |
| 2013/0341849 A1 | 12/2013 | Shimazaki | |
| 2014/0008249 A1 | 1/2014 | Muller | |
| 2014/0027332 A1 * | 1/2014 | Pawlowski | ........... A61M 5/008 |
| | | | 248/346.03 |
| 2014/0027333 A1 | 1/2014 | Pawlowski | |
| 2014/0034545 A1 | 2/2014 | Pawlowski | |
| 2014/0196411 A1 | 7/2014 | Procyshyn | |
| 2015/0089830 A1 | 4/2015 | Wissner | |
| 2015/0190578 A1 | 7/2015 | Okihara | |
| 2015/0238263 A1 * | 8/2015 | Nicoletti | ............... A61M 5/002 |
| | | | 211/126.12 |
| 2015/0299768 A1 | 10/2015 | Ng | |
| 2016/0346777 A1 | 12/2016 | Immerzeel | |
| 2017/0348476 A1 * | 12/2017 | Thompson | ............ A61M 5/008 |
| 2019/0240395 A1 * | 8/2019 | Yoshida | ............... A61M 5/008 |
| 2020/0377242 A1 * | 12/2020 | Dinka | .................... B65D 71/50 |
| 2021/0016950 A1 * | 1/2021 | Yoshida | ............. B65D 81/2015 |
| 2021/0069060 A1 * | 3/2021 | Kloke | ........................ A61J 1/16 |
| 2021/0085562 A1 * | 3/2021 | Deutschle | ............. A61M 5/002 |
| 2021/0236714 A1 * | 8/2021 | Limaye | ................ A61M 5/3205 |

FOREIGN PATENT DOCUMENTS

| | | | |
|---|---|---|---|
| DE | 29703993 | | 7/1998 |
| DE | 102012108215 A1 | | 1/2014 |
| EP | 0832822 A2 | | 4/1998 |
| EP | 0976453 A2 | | 2/2000 |
| EP | 2192042 A1 | | 6/2010 |
| EP | 2599721 A2 | | 6/2013 |
| EP | 2183166 B1 | | 11/2013 |
| EP | 2659980 A1 | | 11/2013 |
| FR | 2049252 A5 * | 3/1971 | ............... B67B 1/00 |
| WO | 2009015862 A1 | | 2/2009 |
| WO | 2009149324 A2 | | 12/2009 |

OTHER PUBLICATIONS

PCT International Preliminary Report on Patentability (PCT/US14/051223), Date of Issuance: Jan. 29, 2015.

PCT International Search Report (PCT/US14/051223), Date of Issuance: Mar. 26, 2015.

European Patent Office; Communication pursuant to Rule 114(2) EPC; (containing observations by a third party concerning the patentability of the invention) in EP Patent 3505458 (which claims priority to the priority application of the present application); Jul. 13, 2020; Munich Germany.

(56) References Cited

OTHER PUBLICATIONS

United States Patent and Trademark Office, "Holding Structure for Simultaneously Holding a Plurality of Containers for Medical, Pharmaceutical or Cosmetic Applications and Transport or Packing Container With Holding Structure"; (priority application for US Patent Publication citation #1, potentially a translated copy of the priority application for Foreign Patent citation #4); May 3, 2012; Alexandria, Virginia.
Extended European Search Opinion, Application No. 19151716.8, Apr. 10, 2019.
Extended European Search Opinion, Application No. 14836259.3, Mar. 13, 2017.
United States Patent and Trademark Office, Non Final Office Action, U.S. Appl. No. 14/912,145; Date of Issuance: Aug. 23, 2019.
United States Patent and Trademark Office, Final Office Action, U.S. Appl. No. 14/912,145; Date of Issuance: Apr. 5, 2019.
United States Patent and Trademark Office, Non Final Office Action, U.S. Appl. No. 14/912,145; Date of Issuance: Mar. 29, 2018.
United States Patent and Trademark Office, Final Office Action, U.S. Appl. No. 14/912,145; Date of Issuance: Nov. 22, 2017.
United States Patent and Trademark Office, Non Final Office Action, U.S. Appl. No. 15/171,015; Date of Issuance: Sep. 23, 2019.
United States Patent and Trademark Office, Non Final Office Action, U.S. Appl. No. 15/171,015 Date of Issuance: Aug. 15, 2018.
United States Patent and Trademark Office, Non-Final Office Action; U.S. Appl. No. 15/950,480, Date of Issuance: Jan. 7, 2022.
United States Patent and Trademark Office, Final Office Action; U.S. Appl. No. 15/950,480, Date of Issuance: Jun. 2, 2022.
United States Patent and Trademark Office, Final Office Action, U.S. Appl. No. 16/238,433, Date of Issuance: Feb. 5, 2021.
United States Patent and Trademark Office, Non-Final Office Action, U.S. Appl. No. 16/238,433, Date of Issuance: Sep. 24, 2020.
United States Patent and Trademark Office, Notice of Allowance, U.S. Appl. No. 16/238,433, Date of Issuance: Jul. 8, 2021.
United States Patent and Trademark Office, Non Final Office Action, U.S. Appl. No. 17/891,347; Date of Issuance: Oct. 30, 2023.
United States Patent and Trademark Office, Final Office Action, U.S. Appl. No. 17/891,347; Date of Issuance: Apr. 16, 2024.

\* cited by examiner

METHOD, DEVICE AND SYSTEM FOR FILLING PHARMACEUTICAL CONTAINERS

CROSS-REFERENCE TO RELATED APPLICATIONS

The present application is a Continuation-in-Part of U.S. patent application Ser. No. 17/891,347, filed Aug. 19, 2022; which is a continuation of U.S. patent application Ser. No. 15/950,480, filed Apr. 11, 2018, which has issued as U.S. Pat. No. 11,518,555, on Dec. 6, 2022; which is a division of U.S. patent application Ser. No. 14/912,145, filed Feb. 15, 2016, which has issued as U.S. Pat. No. 10,781,002, on Sep. 22, 2020; which is a U.S. national stage application of PCT International Patent Application Number PCT/US2014/051223, filed Aug. 15, 2014, which has published as International Publication Number WO 2015/023924 A2, on Feb. 19, 2015; which claims which claims priority under 35 U.S.C § 119(e) of U.S. Patent Provisional Application Ser. No. 61/867,014, filed Aug. 16, 2013, the disclosures of which are incorporated by reference herein.

PRIOR ART

The present invention relates to a device, system and method for filling and sealing of pharmaceutical containers. In particular, it relates to a device, system and method for filling and sealing of pharmaceutical containers within a controlled environment chamber.

BACKGROUND OF THE INVENTION

By its very nature, the production of sterile pharmaceuticals by humans can be problematic. Humans can be a large source of microbial contamination. Also, with increased potencies, some drugs can be hazardous in occupational exposure. For at least these reasons, robotics is attractive in dosage manufacturing to limit human contact. Isolator technology, which provides a solid barrier between a process and humans, can also be used in dosage manufacturing to limit human contact.

Traditionally equipment for filling, stoppering and capping of pharmaceutical containers was designed to process singulated containers and typically employed vibratory bowls for the supply of elastomeric closures and shrink caps. More recently, equipment has become available to process multiple containers in nested arrangements. Such container arrangements can be cleaned, depyrogenated, and sterilized at the site of the container manufacturer. This simplifies the equipment requirements and operations of the pharmaceutical manufacturer.

A significant portion of all filling equipment is of such complexity that it cannot be integrated in a controlled environment enclosure. Such filling equipment can only be installed in a restricted access barrier system; which environment is much less secure than complete physical barrier provided by a controlled environment enclosure such as an isolator. The other negative aspect of complex equipment is cleanability, which can be a concern for multi-product use and in particular for highly potent products. In particular, systems employing conveyor belts to convey nested containers are known, and these present considerable challenges as regards cleaning to a degree acceptable in the pharmaceutical industry.

The handling and singulation of elastomeric stoppers and aluminum crimp caps is known to be problematic at times. Blockages of vibratory chutes cannot be prevented at all times and require operator interventions from time to time to free blockages. This has led to the use of nested pharmaceutical containers.

Some of the newer filling equipment accepts the nested containers, but then denests the containers to process them in a singulated fashion, exactly as happens in the traditional equipment. They thereby forego some of the inherent benefits provided in the first place by the nesting of the containers. Other equipment variants denest the elastomeric closures and aluminum crimp caps before then applying them in singulated fashion.

It is good practice in automation not to let go of a part such as a pharmaceutical container or closure once it is properly held and to only let go of the part once any processing involving the part is completed. Most prior art vial filling machine designs deviate from this rule, because of perceived difficulties in placing of stoppers and caps when containers are located in a nest.

Another good practice is to avoid unnecessary handling of parts under aseptic conditions. Stopper and closure elements are typically singulated in industry using vibratory bowls and transported using vibratory chutes. The vibratory bowl and chutes contact the stoppers, the surfaces of which will eventually be in direct contact with the product inside the container. To address this problem, it is generally considered necessary to steam sterilize the vibratory bowls and chutes. However, it is practically impossible to transfer the stopper bowl and chutes aseptically from the sterilizing autoclave to the processing environment.

As regards the design of particular closure nests, an example of a prior art vial closure nest is described in US 20120248057 A1. The particular example is limited in practical applications for at least three reasons.

Firstly, commercially available trays typically have 60-120 containers, the quantity varying with vial diameter. The packing density of 60-120 containers with a foot print of 8"×9" in a nest does not allow for a matching cap nest design as shown in US 20120248057 A1, because its holding features take up too much space. The force required for capping for each vial is typically in the range of 40-50N, and is therefore an order of magnitude larger than the force required for removal of the tamper evident feature shown in the same patent application.

Secondly the closure has to be held by the nest in such a way that the force required for capping of the vial is directed without a resulting force vector acting on the tamper evident feature. When considering simultaneous capping, the forces can add up to 6000N, further stressing the need for a closure nest design that does not distort or flex under load.

Thirdly, the closure needs to be held in the nest in such a way that its accidental release is prevented during transport and handling; yet it should allow for the cap to be removed without risk of removing the tamper evident feature.

In summary, while the use of nested containers has been established in industry, challenges remain as to how to manage such containers within a controlled environment while ensuring that the equipment used in the process is cleanable to a degree acceptable in the pharmaceutical industry, an industry in which regulations are exceptionally stringent.

SUMMARY OF THE INVENTION

In a first aspect this disclosure provides method for aseptically filling a first plurality of containers with a pharmaceutical product in a first controlled environment enclosure, the method comprising: decontaminating at least one of first and second sealed nested materials in a first transfer chamber; placing the first controlled environment enclosure in spatial communication with the first transfer chamber; aseptically gripping the at least one of first and second sealed nested materials; transferring the at least one of first and second sealed nested materials to the controlled environment enclosure; removing from one of the first and second sealed nested materials a container nest holding the first plurality of containers and removing from the other of the first and second sealed nested materials a closure nest releasably retaining a plurality of closures; filling the first plurality of containers with the pharmaceutical product in the first controlled environment enclosure; and at least partially closing the first plurality of containers with the plurality of closures. The method may further comprise maintaining aseptic conditions in the first controlled environment chamber and weighing the first plurality of containers while it is in the container nest.

The first plurality of containers may be in the closure nest during the at least partially closing. The aseptically gripping may comprise manipulating a first articulated arm apparatus. The closing of the first plurality of containers may comprise manipulating an articulated arm apparatus to place the first plurality of containers in a stoppering apparatus. The filling may comprise manipulating a second articulated arm apparatus. The filling of the first plurality of containers may comprise filling simultaneously at least a portion of the first plurality of containers.

The filling of the first plurality of containers may comprises manipulating an articulated arm apparatus to move one of the container nest and a fill needle system dispensing the pharmaceutical product. The dispensing of the pharmaceutical product may comprise dispensing the pharmaceutical product simultaneously from a plurality of fill needles. The removing of the container nest holding the first plurality of containers may be by manipulating a second articulated arm apparatus.

The method may further comprise returning the filled containers to the transfer chamber and terminating the spatial communication between the transfer chamber and the first controlled environment chamber.

The at least partially closing the first plurality of containers may comprise partially inserting the first plurality of containers; lyophilizing the pharmaceutical product in the first plurality of containers; and at least partially sealing the first plurality of containers by exerting pressure on at least a portion of a plurality of caps associated with the plurality of stoppers. The lyophilizing the pharmaceutical product may comprises lyophilizing the pharmaceutical product in a stoppering apparatus having an interior that may be isolated from the interior of the first controlled environment enclosure.

The partially closing of the first plurality of containers may comprises simultaneously partially closing at least a portion of the first plurality of containers. In other embodiments, the partially closing the first plurality of containers may comprise partially closing all the containers in the container nest simultaneously.

The at least partially closing may comprise completely closing and the method may further comprise transferring the filled containers to a second controlled environment enclosure. In some embodiments the partially sealed first plurality of containers may also be transferred to a second controlled environment chamber.

In another aspect the disclosure provides a method for aseptically sealing a pharmaceutical product into a plurality of containers, the method comprising: introducing a first plurality of containers into a controlled environment enclosure; releasably suspending from a closure nest in the controlled environment a plurality of aseptic closures; filling at least a first portion of the first plurality of containers with the pharmaceutical product; and simultaneously sealing at least partially a second portion of the first plurality of containers with a portion of the plurality of aseptic closures while releasably retaining the aseptic closures in the closure nest. The method may further comprise lyophilizing the pharmaceutical product in the second portion of the first plurality of containers while releasably retaining the aseptic closures in the closure nest.

The releasably suspending and releasably retaining may comprise releasably engaging with a holding feature of each of the plurality of aseptic closures. The releasably engaging with the holding feature may comprise elastically engaging with the holding feature. The elastically engaging with the holding feature may comprises engaging the holding feature with a spring-loaded retaining structure portion of the closure nest.

Some or all of the plurality of the aseptic closures retained by the closure nest may be used to either fully or partially seal the pharmaceutical product into the containers. The plurality of containers may be equal in number to the number of aseptic closures releasably suspended by the closure nest. Two or more containers may be filled simultaneously.

In another aspect this disclosure provides a closure nest for releasably retaining a plurality of closures for pharmaceutical containers, the closure nest comprising a substantially planar support structure and a plurality of closure retaining structures arranged on the planar support structure, the closure retaining structure comprising a plurality of closure engaging structures arranged to engage with a holding feature on one of the plurality of closures and comprising at least one spring-loaded arm. The closure retaining structures may further comprise a plurality of stop structures configured to confine the one of the plurality of closures and exert force on the one of the plurality of closures when the closures and the closure nest are pushed together vertically.

The at least one spring-loaded retaining structure may be monolithically integrated with the closure nest and the closure nest may be a polymeric closure nest. The at least one spring-loaded retaining structure may be a flexible retaining structure and, in some embodiments, the flexible retaining structure may be a polymeric structure. The plurality of closure engaging structures may be arranged in a geometric pattern and, in some embodiments, the geometric pattern may be a close packed pattern. The geometric pattern may match center-to-center a pattern of container-holding structures on a container nest.

BRIEF DESCRIPTION OF DRAWINGS

The drawings illustrate generally, by way of example, but not by way of limitation, various embodiments discussed in the present document.

Figure 1:
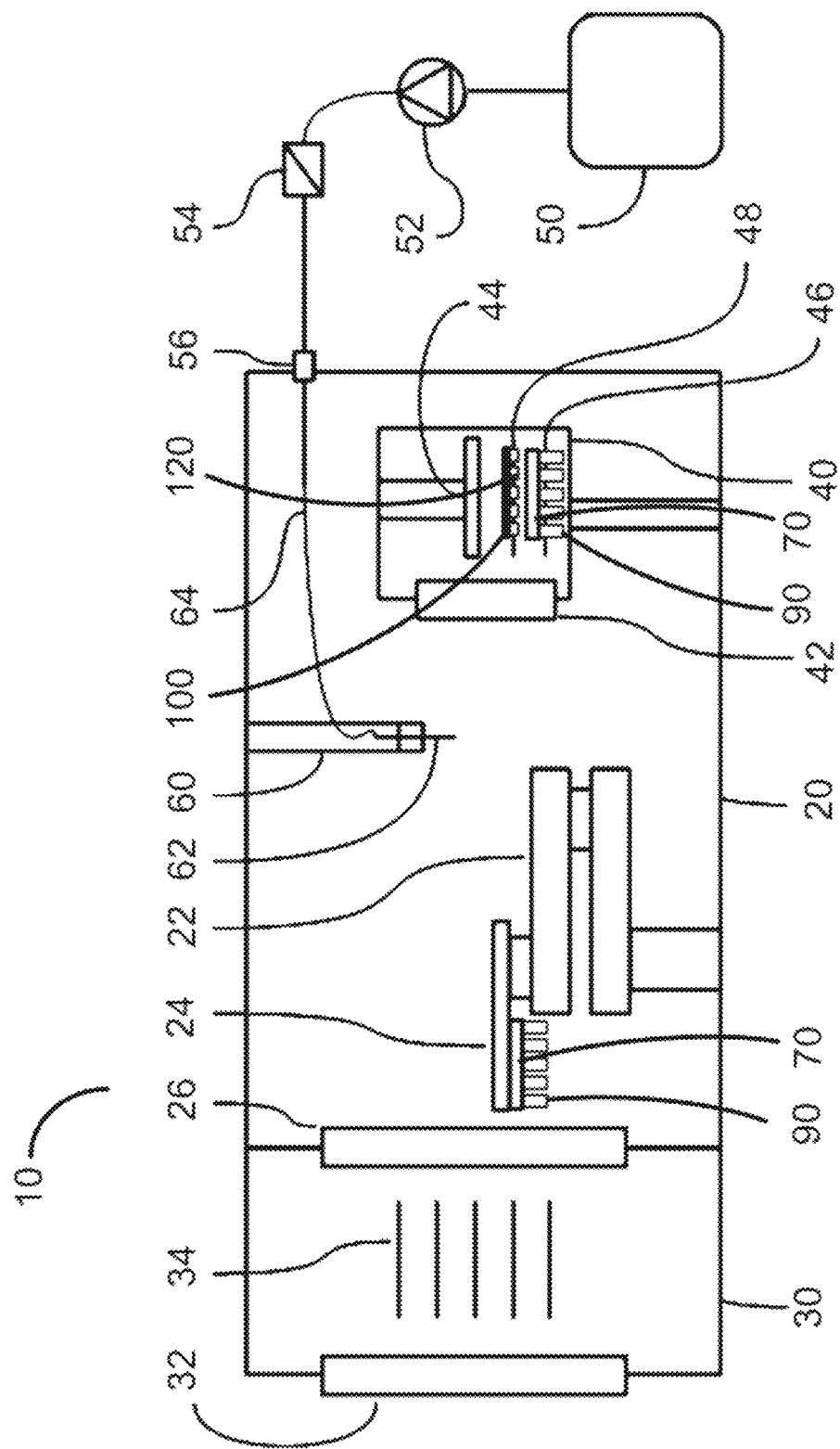
FIG. 1 shows a system for filling pharmaceutical containers.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in one or more forms, and such exemplifications are not to be construed as limiting the scope of the invention in any manner.

DETAILED DESCRIPTION OF THE INVENTION

Figure 2:
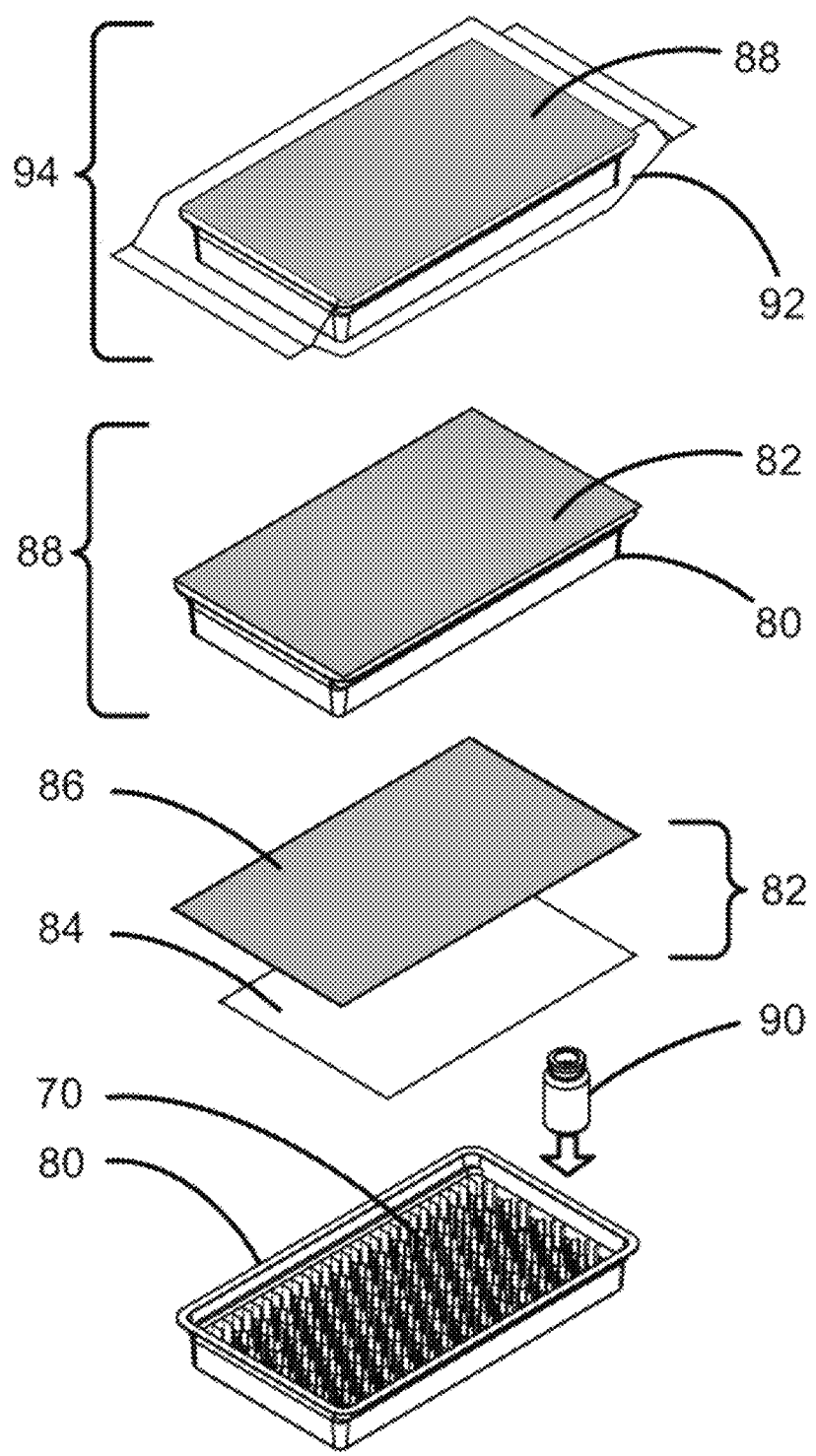
FIG. 2 shows from bottom to top the arrangement and contents of a sealed nested container package as employed in the present invention.
Figure 3:
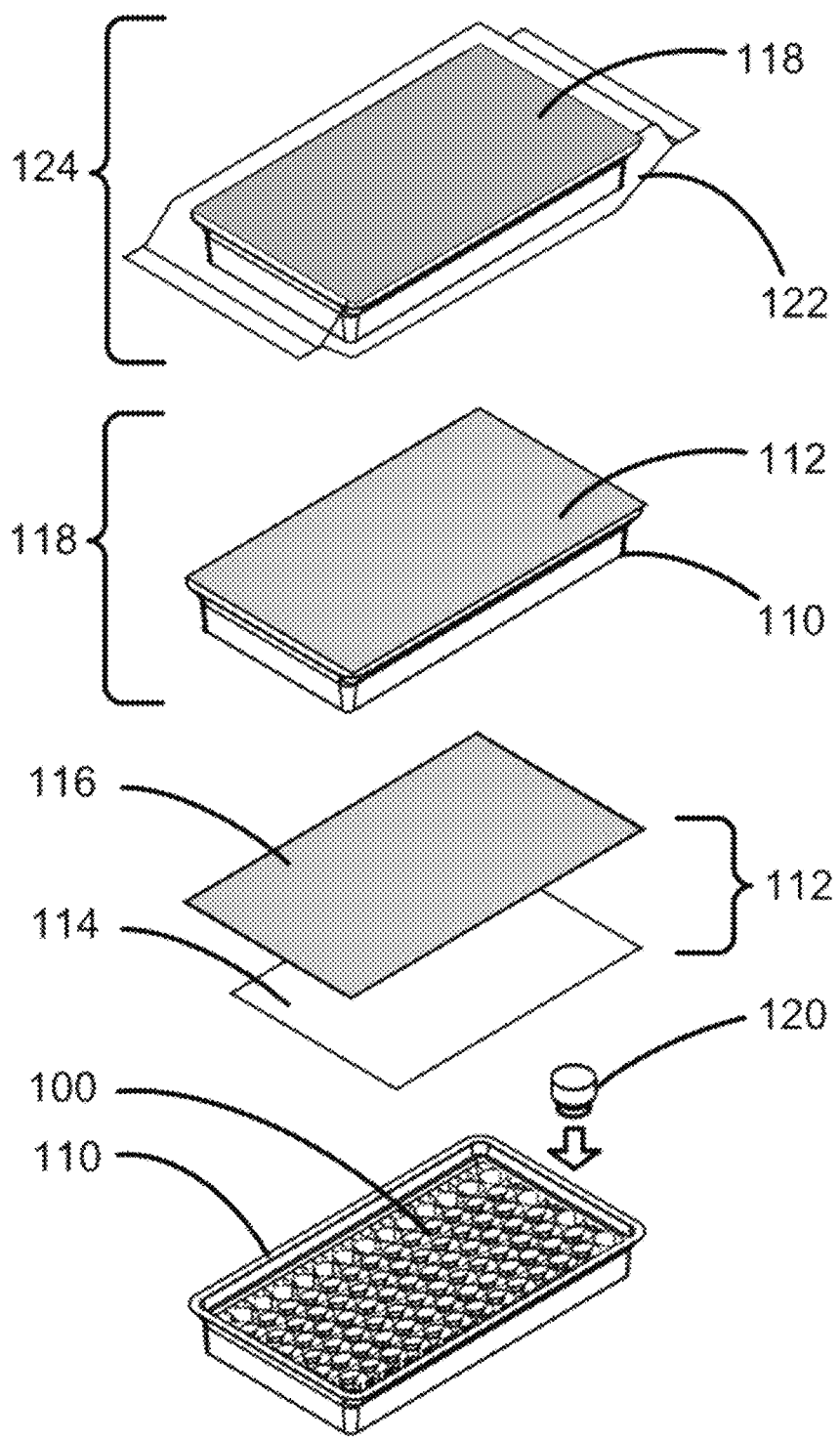
FIG. 3 shows from bottom to top the arrangement and contents of a sealed nested closure package as employed in the present invention.

A method and associated system for filling pharmaceutical containers is described at the hand of the schematic depiction in FIG. 1, as well as FIG. 2 and FIG. 3. Filling system 10 for filling pharmaceutical containers 90 with a pharmaceutical product is disposed within controlled environment enclosure 20. Controlled environment enclosure 20 is configured for maintaining an aseptic condition. In some embodiments, in particular that shown in FIG. 1, the pharmaceutical product may be a liquid product. In other embodiments, the product may be a solid pharmaceutical product. The pharmaceutical product may potentially be toxic or otherwise harmful. As will be described in more detail below, filling system 10 may be configured to locate, target, and fill containers 90 held in a container nest 70 within a container tub 80 (see FIG. 2). Many types of containers 90 are contemplated herein, including, but not limited to vials, syringes, bottles, and ampoules.

Pharmaceutical containers made from tubular glass are commercially available in a range of different sizes with dimensions according to the DIN/ISO 8362-1 standard. Molded glass vials are commercially available in a range of different sizes with dimensions according to the DIN/ISO 8362-4 standard. Frequently vials are used that have one or more additional custom specifications. In some cases these specifications may deviate from the standards.

Glass has traditionally been the only choice for container material but problems with glass breakage, delamination, particulates due to glass-on-glass collisions, and stability of some products resulted in development and usage of suitable polymeric materials. One example of such polymeric material is TOPAS® cyclic olefin polymer. Vials made of polymeric materials are commercially available in size ranges and dimensions that typically closely mimic those of glass vials.

Polymeric materials are significantly less scratch resistant than glass and existing aseptic processing equipment has not been redesigned to mitigate the risks of scratching. Scratched surfaces of containers are a serious concern for the perceived quality of the product, but also severely limits the inspection of the containers for particulates. Such inspection is typically a regulated requirement for good manufacturing practice.

Processing of vials in nests can be an effective solution to prevent scratching of vials such as typically occurs during singulated handling of vials or during simultaneous handling of rows of vials. Handling of vials in nests avoids all vial-tooling and vial-vial collisions. The nests are particularly well suited for processing of polymeric vials but may be used equally well for processing of glass vials.

Nests for syringes have been commercially available for some decades, but they are a comparatively new concept for the management of pharmaceutical containers beyond syringes. Suitable container nests 70 are available from Nuova Ompi of Newtown, PA and from Afton Scientific of Charlottesville, VA.

Containers 90, tub 80, and container nest 70 are shown in more detail in FIG. 2 in which the packaging of containers 90 is depicted in stages of completeness from bottom to top. Container nest 70 and container tray or tub 80 may be, for example without limitation, of the polystyrene EZ-FILL™ type provided by Nuovo Ompi of Newtown, PA. These are supplied with a sealing Tyvek™ cover 82 permeable to ethylene oxide for purposes of sterilization. Cover 82 may comprise of a permeable Tyvek™ sheet 84 and a Tyvek™ lid 86 over the permeable Tyvek™ sheet 84. In the present specification we refer to the combination of tub 80, sealed with cover 82 and containing nest 70 with containers 90 as "sealed nested container materials" 88. Sealed nested container materials 88 may be supplied packaged in steri-bag 92. In the present specification we refer to this entire combination, as shown in FIG. 2, as a "sealed nested container package" 94.

Closures 120 for containers 90 may be supplied in similar fashion to containers 90, as shown in FIG. 3. Closures may comprise caps 130 with integrated stoppers 140 and are described in more detail below at the hand of FIG. 6 and FIG. 7. Closures 120 are supplied arrayed within closure nest 100 in closure tub 110 with sealing Tyvek™ cover 112 permeable to ethylene oxide for purposes of sterilization. Cover 112 may comprise of Tyvek™ sheet 114 and Tyvek™ lid 116 over permeable Tyvek™ sheet 114. In the present specification we refer to the combination of tub 110, sealed with cover 112 and containing closure nest 100 with closures 120 as "sealed nested closure materials" 118. Sealed nested closure materials 118 may be supplied packaged in steri-bag 122. In the present specification we refer to this entire combination, as shown in FIG. 3, as a "sealed nested closure package" 124. In the present specification sealed nested container materials 88 and sealed nested closure materials 118 are collectively referred to as "sealed nested materials."

Tubs 80, 110 may be handled within controlled environment enclosure 20 by articulated arm apparatus 22 disposed within controlled environment enclosure 20. Articulated arm apparatus 22 comprises an end of arm tool 24 configured to hold tubs and nests. Articulated arm apparatus 22 may be, without limitation, a robotic articulated arm. Suitable robotic articulated arms are described in U.S. Patent Application Publication US 2009/0223592 A1 and in WIPO PCT Application Publication Number WO 2013/016248 A1, both wholly incorporated herein by reference.

In contrast to prior art conveyor belt systems, sealed nested closure packages 92, 122, tubs 80, 110 and nests 70, 100 are gripped and held by end of arm tool 24, which may be capable of gripping or holding. Furthermore, as described in co-pending patent application U52009/0223592 A1, titled "Robotic filling systems and methods", articulated arm apparatus 22 allows environment enclosure 20 to be cleanable to a much greater degree than a conveyor belt system. Articulated arm apparatus 22 lends itself to being fully automated and this allows a greater degree of automation of the entire container-filling process within the controlled environment enclosure 20 than what is otherwise attainable under such decontaminated or sterilized conditions as pertain within controlled environment enclosure 20. The use of articulated arm apparatus 22 eliminates some of the difficulties described in the background to this specification. In particular, articulated arm apparatus 22 allows the relevant nest to be held in a single action until processing is completed and the container or closure 90, 120 itself is not held, as all handling operations may be carried out by means of nests 70, 100 or tubs 80, 110.

As regards method, the sealed nested container or closure package 94, 124 may be opened outside filling system 10. Cover 82, 112 may be highly permeable to the atmosphere and therefore the step of removing sealed tub 80, 110 from its packaging 88, 118 may expose not only sealed tub 80, 110 but also its contents to ambient atmosphere.

With inner door 26 between transfer chamber 30 and controlled environment enclosure 20 closed, outer door 32 of transfer chamber 30 may be opened. Sealed tub 80, 110 containing nest 70, 100 with containers or closures 90, 120 may then be transferred via outer door 32 of transfer chamber 30 onto shelves 34 of transfer chamber 30. Shelves 34 may be, without limitation, carousel shelves.

In a next step, sealed tub 80, 110 may be decontaminated inside transfer chamber 30. Suitable decontamination includes, but is not limited to, exposure to hydrogen peroxide gas or ozone. Other suitable means of decontamination may include, without limitation, electron beam irradiation and ultraviolet irradiation. Transfer chamber 30 may be any isolatable and decontaminatable vessel, including without limitation, an autoclave or a radiation based decontaminatable vessel that is configured to be placed in spatial communication with controlled environment enclosure 20. In the present specification, the term "transfer chamber" is used to describe any such vessel that is decontaminatable and which may be placed in spatial communication with controlled environment enclosure 20. Further examples of vessels suitable for use as transfer chamber 30 are provided below.

In some cases, it may be advantageous to decontaminate transfer chamber 30 together with controlled environment enclosure 20. When decontaminated simultaneously, the seals on inner door 26 will be decontaminated. In some other cases the seal area of door 26 may be negligible.

Covers 82, 112 may be highly permeable to gases and decontamination agents. Certain materials can be susceptible to significant sorption of decontamination agents during decontamination of the transfer chamber. Exposure of pre-sterilized materials of tub 80, 110 to decontamination agents can be prevented by use of an impermeable cover instead of cover 82, 112, or by addition of an impermeable layer on top of cover 82, 112. Suitable methods for adding such an impermeable layer includes, without limitation adhesive film and heat seals.

In another aspect of this invention, transfer chamber 30 may be a vacuum chamber; and may be configured to sterilize the contents of tub 80, 110. Thermal and fast non-thermal sterilization cycles are well known in the art. The fast cycle time of non-thermal sterilization cycles may be particularly advantageous. Such cycles are typically used in hospital settings, for example for sterilization of surgical instruments. Gaseous sterilization agents can be hydrogen peroxide, ozone and combinations thereof.

Transfer chamber 30 may be equipped with a plasma generator for rapid activation and removal of sterilization agents. The addition of non-thermal sterilizing transfer chamber 30 to controlled environment enclosure 20 is particularly well suited for processing of nested pharmaceutical container materials.

When tub 80, 110 has been decontaminated, inner door 26 may be opened to place the interior of transfer chamber 30 in communication with the interior of controlled environment enclosure 20 and articulated arm apparatus 22 may be employed to remove the sealed nested materials 88, 118 from transfer chamber 30 into controlled environment enclosure 20 through inner door 26. Since articulated arm apparatus 22 is a decontaminated or sterilized structure, and it is gripping tub 80, 110 in a decontaminated environment, the gripping of tub 80, 110 by articulated arm apparatus 22 is referred to in the present specification as "aseptically gripping." By way of contrast, other methods of transfer may not involve gripping or may not be aseptic, requiring controlled environment enclosure 20 to be sterilized or decontaminated after transfer.

Articulated arm apparatus 22 may be employed to remove one or both of lid 86, 116 and sheet 84, 114 within controlled environment enclosure 20. A suitable method for using articulated arm apparatus 22 to remove lid 86, 116 is described in International Patent Application PCT/US13/39455, published as International Application No. WO/2013/166379 on Jul. 11, 2013, which is hereby incorporated in full. Sheet 84, 114 may alternatively be removed using suitable suction. Articulated arm apparatus 22 may then remove the nests 70, 100 with containers or closures 90, 120 from tubs 80, 110.

Controlled environment enclosure 20 comprises filling station 60. In one embodiment, shown in FIG. 1, filling station 60 comprises fill needle system 62 supplied with liquid product via fluid path 64 from fluid reservoir 50 under the action of suitable pump 52. Pump 52 may be, without limitation, a peristaltic pump. The liquid product may be filtered via suitable filter 54. The fluid may enter into controlled environment enclosure 20 along fluid path 64 via a suitable fluid path connector 56.

In one embodiment of the method, shown in FIG. 1, articulated arm apparatus 22 may move an opening of each container 90 one after the other under fill needle system 62. Fill needle system 62 may comprise a single fill needle, or may comprise a plurality of fill needles. If fill needle system 62 comprises a single fill needle, containers 90 are filled one after the other by moving container nest 70 and operating fill needle system 62 to fill containers 90. If fill needle system 62 comprises a plurality fill needles, containers 90 are filled one plurality after another by moving container nest 70 and operating the fill needle system to fill containers 90. The end of arm tool 24 may be rotated to align containers 90 with the fill needle(s) of fill needle system 62.

Figure 4:
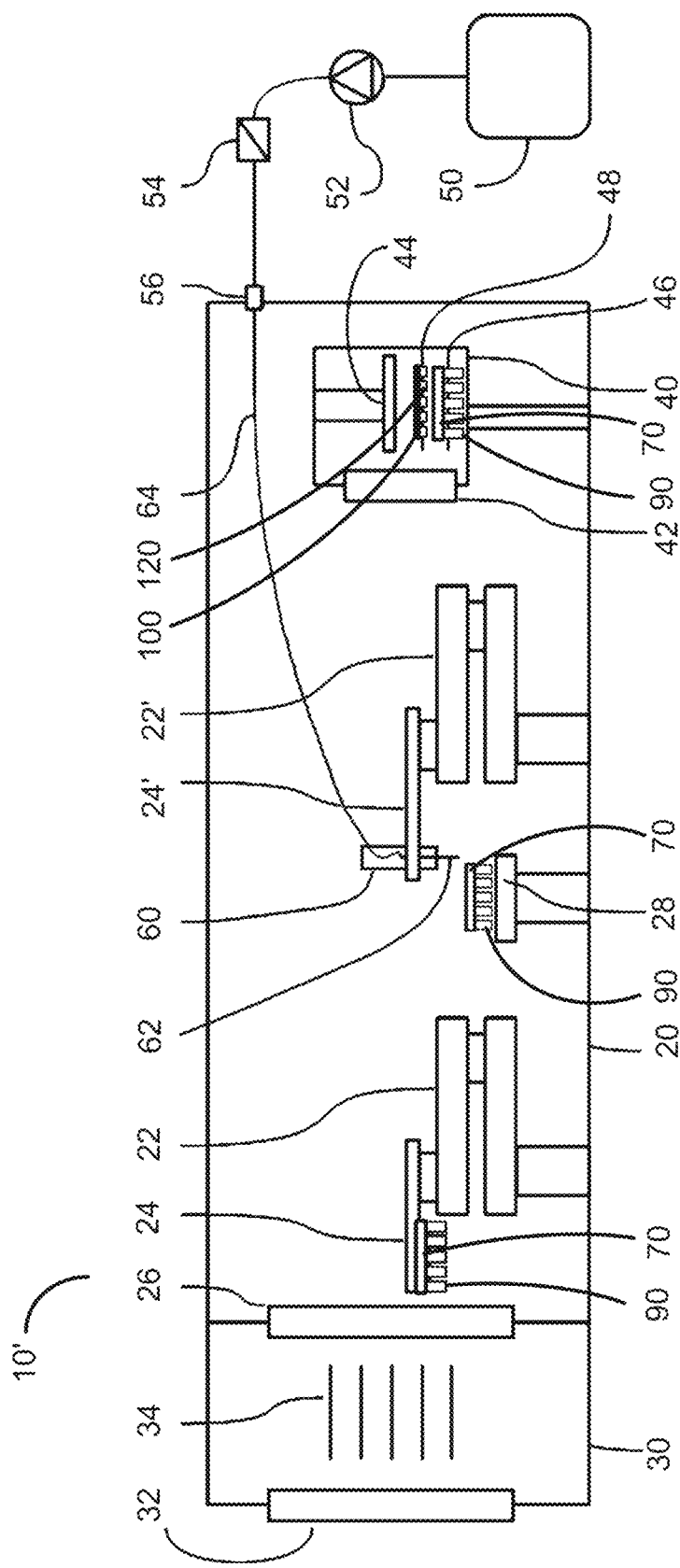
FIG. 4 shows an alternative embodiment of a system for filling pharmaceutical containers.

In another embodiment, shown in FIG. 4, container nest 70 with containers 90 is placed in a fixed position on pedestal 28 and fill needle system 62 is spatially manipulated by suitable second articulated arm apparatus 22' to place fill needle system 62 above the openings of containers 90. Containers 90 are thus filled by moving and operating the fill needle system. The second articulated arm apparatus may be of the same type as articulated arm apparatus 22. It may have an end of arm tool 24' configured for manipulating fill needle system 62. Having a second articulated arm apparatus dedicated to filling, frees up articulated arm apparatus 22 for handling of second tub (of the structure of tub 80, 110) and nest 70, 100 while containers 90 from first tub 80, 110 are being filled.

Filling system 10 comprises stoppering apparatus 40 that may have an interior that may be isolated from the interior of controlled environment enclosure 20. The interior of controlled environment enclosure 20 is in communication with an interior of stoppering apparatus 40 via stoppering system door 42. In the embodiment depicted in FIG. 1, stoppering apparatus 40 is shown as being contained within controlled environment enclosure 20. In other embodiments stoppering apparatus 40 may be arranged in a separate chamber from controlled environment enclosure 20 and may communicate with controlled environment enclosure 20 via a suitable stoppering system door.

Container nest shelf 46 and closure nest shelf 48 are disposed within the interior of stoppering apparatus 40. Container nest shelf 46 and closure nest shelf 48 are disposed to allow closures 120 in closure nest 100 to be centered on the openings of containers 90 in container nest 70 when closure nest 100 and container nest 70 are placed on respectively container nest shelf 46 and closure nest shelf 48.

In one embodiment of the method, shown in FIG. 1, stoppering system door 42 is opened and articulated arm apparatus 22 moves container nest 70 with filled containers 90 to place it on container nest shelf 46. Articulated arm apparatus 22 may be used to move closure nest 100 with closures 120 to place it on closure nest shelf 48. Each filled container 90 thereby has a closure concentrically positioned directly above it. Closure nest 100 with closures 120 may be placed on closure nest shelf 48 either before or after container nest 70 with filled containers 90 is placed on container nest shelf 46. To this end container nest 70 and closure nest 100 may have mutually matching geometries to arrange each closure 120 concentrically with the opening of each corresponding container 90.

After container nest 70 with containers 90 and closure nest 100 with closures 120 have been located on their respective shelves 46 and 48 within stoppering apparatus 40, stoppering system door WO12013/166379 is closed. To the extent that some stoppering procedures need to be performed under vacuum conditions or under inert atmosphere, the required vacuum or inert atmosphere may then be established within the interior of stoppering apparatus 40.

Stoppering apparatus 40 is configured to close all containers simultaneously using, for example, actuated ram 44. For some subsequent operations, such as freeze-drying, the stoppers are required to be only partially inserted and actuated ram 44 may be configured to only partially insert stoppers 140. After insertion of stoppers 140, articulated arm apparatus 22 removes nest 70 with containers 90 from stoppering apparatus 40.

In another embodiment of articulated arm apparatus 22, it loads nested containers 90 and nested caps 130 with integrated stoppers 140 into stoppering apparatus 40. As described above, apparatus 40 may simultaneously stopper and cap nest 70 of containers 90.

After completion of the stoppering and capping, articulated arm apparatus 22 moves nested containers 90 back into transfer chamber 30. In other embodiments, articulated arm apparatus 22 may move filled, stoppered, and capped nest 70 with containers 90 to an adjacent controlled environment enclosure (not shown) through a suitable communicating door (not shown). Capped nest 70 with containers 90 may be moved to the adjacent controlled environment enclosure with the containers only partially stoppered or partially closed.

Figure 5A:
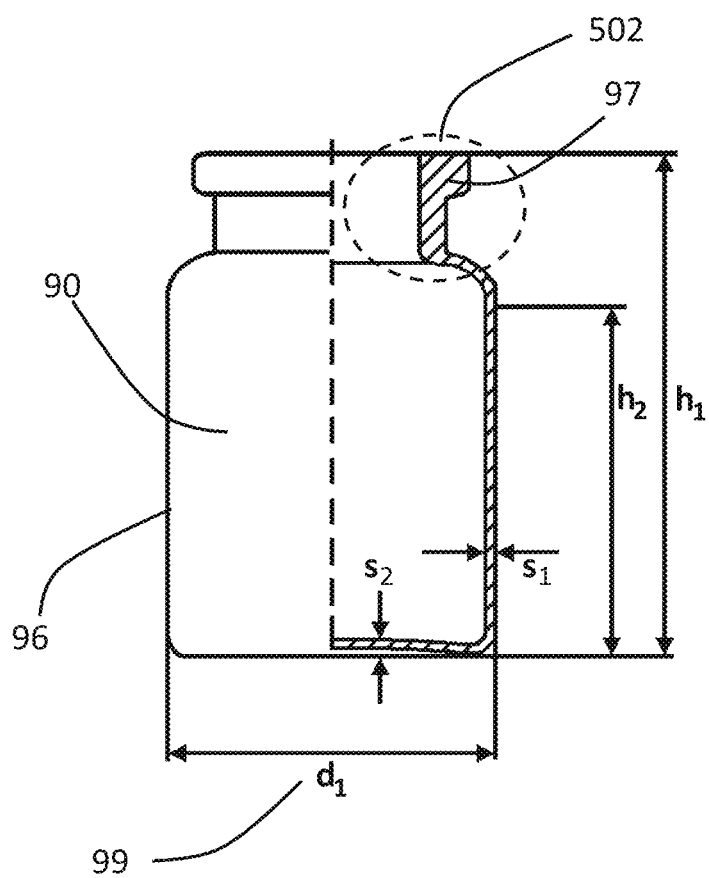
FIG. 5A and FIG. 5B show two views of a pharmaceutical container and its key dimensions
Figure 5B:
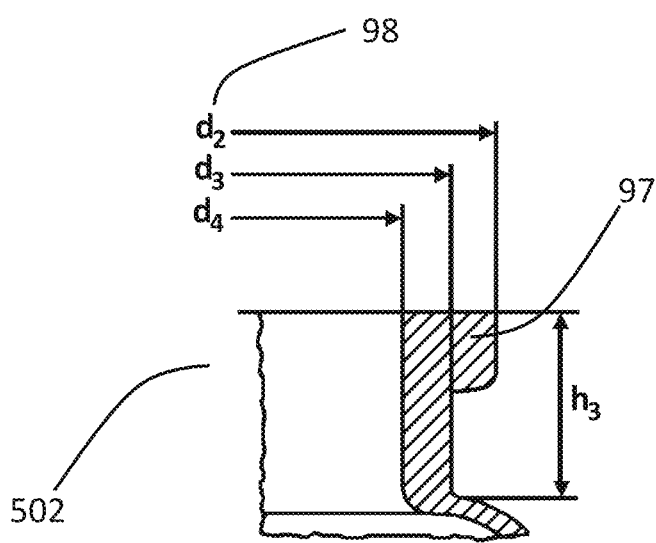

FIGS. 5A and 5B show the generic shape of pharmaceutical container 90, which in this example is a vial. The container comprises cylindrical container body 96 and neck 97. Neck 97 of container 90 is shown in enlarged view in FIG. 5B in which area 502 of FIG. 5A is presented in more detail. The diameters $d_1$, $d_2$, $d_3$ and $d_4$ of different portions of container 90 are provided in FIG. 5A and FIG. 5B, as are the heights $h_1$, $h_2$ and $h_3$ of different portions of container 90. Symbols $s_1$ and $s_2$ give the wall thickness and base thickness of cylindrical container body 96 respectively. Typically, the $d_2$ neck diameter 98 of container 90 is only slightly smaller than the $d_1$ main diameter 99 of container 90. This allows the placement of closure 120 on container 90 without reducing the packing density of containers 90 in nest 70 of FIG. 2. Therefore, the densest circle packing density of closure 120 is closely the same as the packaging of the containers. It is particularly advantageous for closure nest 100 to have exactly the same packaging geometry as the container nest; so that closure nest 100 may be overlayed on container nest 70 and closures 120 may be applied without movement of container nest 70. Closures 120 may be applied one at a time, multiples in a row, or all at once.

Figure 6A:
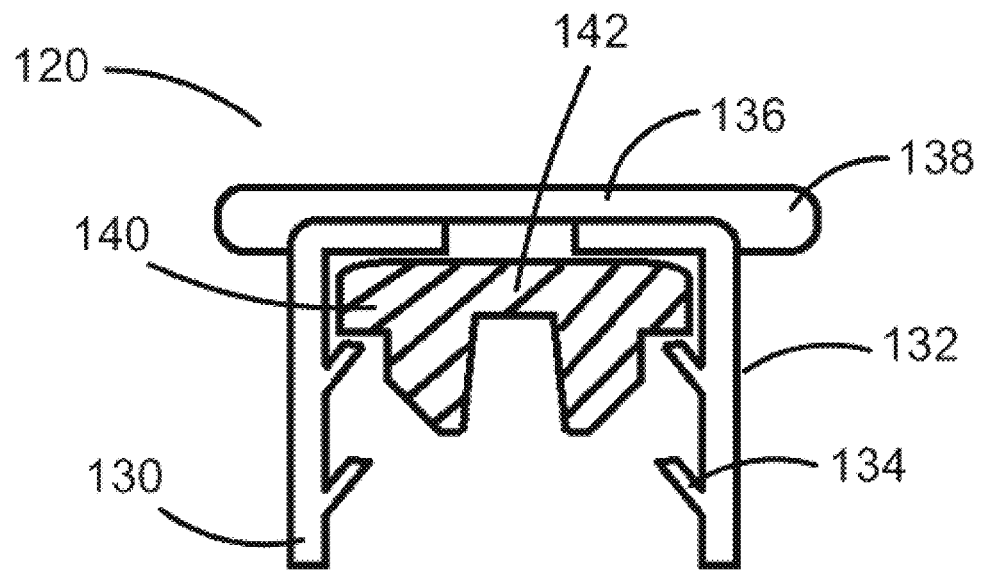
FIG. 6A and FIG. 6B show two embodiments of closures for pharmaceutical containers

In another aspect, this specification provides a nest for holding closures. We consider first generic closure 120 provided in FIG. 6A. Closure 120 comprises cap 130 and stopper 140. Stopper 140 has thinner septum 142 that is piercable by an extraction needle such as that of a syringe. Cap 130 comprises cylindrical cap body 132, at least a first set of barbed retention features 134, and tamper-evident flip-off cover 136. In the example of FIG. 6A, two sets of barbed retention features 134 are shown and these may be arranged in a pattern around the inner perimeter of cap 130. Tamper-evident flip-off cover 136 is manufactured as an integral part of cap 130 such that, when cover 136 is removed, it cannot be replaced. This serves as verification that septum 142 of stopper 140 has been exposed. Cover 136, in this particular example, has a larger diameter than body 132 of cap 130. This may serve as a holding feature 138 for cap 130 and thereby for closure 120, which may be exploited for holding closure 120 in nest 100.

Figure 6B:
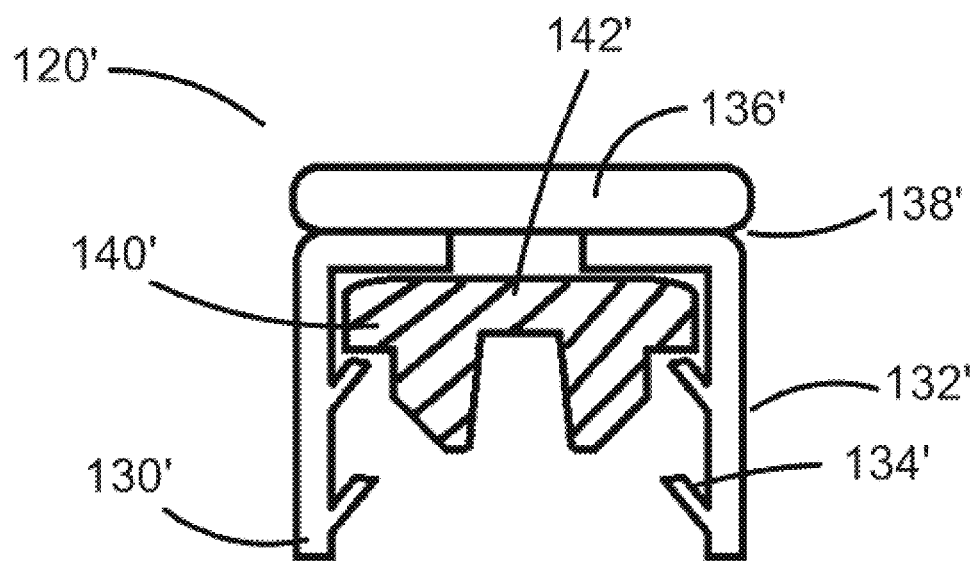

In FIG. 6B another example closure 120' is shown. Closure 120' comprises cap 130' and stopper 140'. Stopper 140' has thinner septum 142' that is piercable by an extraction needle such as that of a syringe. Cap 130' comprises cylindrical cap body 132', at least a first set of barbed retention features 134', and tamper-evident flip-off cover 136'. In the example of FIG. 6B, two sets of barbed retention features 134' are shown and these may be arranged in a pattern around the inner perimeter of cap 130'. Tamper-evident flip-off cover 136' is manufactured as an integral part of cap 130' such that, when cover 136' is removed, it cannot be replaced. This serves as verification that septum 142' of stopper 140' has been exposed. Cover 136', in this particular example, has the same diameter as body 132' of cap 130'. However, dimple 138' is provided at the join between cover 136' and cap body 132'. This may serve as holding feature 138' for cap 130' and thereby for closure 120', which may be exploited for holding closure 120' in nest 100.

In the prior art these vial caps have been made from aluminum with polymeric flip-off covers. Capping of aluminum caps typically generates considerable amounts of non-viable particles and this has tended to make aluminum caps unacceptable in recent times. Caps made of polymeric material are now commercially available. The polymeric caps are particularly well suited for use with polymeric containers, but may also be used for glass containers.

The most optimal geometry of containers 90 in a nest 70 follows the mathematical theories of equal sized circle packing, leading typically to hexagonal, triangular, square, elongated triangular; snub square and other related geometrical patterns of container positions in nest 70.

In this specification, closure nest 100 is presented in which the geometrical arrangement of the closures 120, 120' closely matches the geometrical patterns of container positions in nest 70. In some embodiments, closure nest 100 has exactly the same packaging geometry as container nest 70, with the distribution of closure centers in closure nest 100 lining up within a working tolerance with the distribution of container centers in container nest 70. This allows closure nest 100 to be overlayed on container nest 70, and closures 120, 120' to be applied to containers 90 so that all closures 120, 120' in closure nest 100 may be applied to all corresponding containers 90 in container nest 70 without any substantial movement of either nest 70 or nest 100. Closures 120, 120' may be applied one at a time, one row at a time, or all at substantially the same time.

Figure 7A:
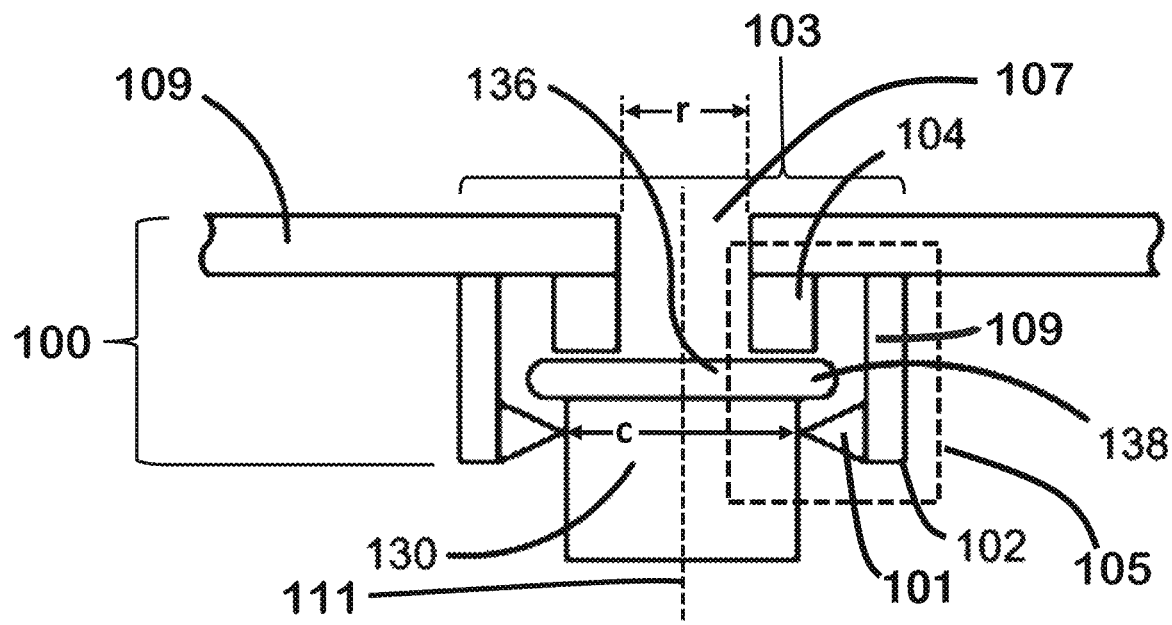
FIG. 7A and FIG. 7B show two embodiments of closure retaining structures for closure nests.

In FIG. 7A a part of closure nest 100 is shown schematically, depicting disposed on planar support structure 109 a closure retaining structure 103 for single cap 130 of closure 120 of FIG. 6A. In FIG. 7A, associated stopper 140 is contained within cap 130 and is therefore not visible (See FIG. 6A). It is to be understood that the part of closure nest 100 shown in FIG. 7A is descriptive of a plurality of such parts, and that the parts are arranged two dimensionally to concentrically align a plurality of containers 90 in container nest 70 center-to-center with a matching plurality of closures 120 held by closure nest 100. Closure retaining structure 103 comprises a plurality of closure engaging structures 105 disposed annularly about cylindrical axis 111 of corresponding closure 120. Each closure engaging structure 105 comprises a spring-loaded arm 102 including suspension ledge 101 (a triangle in the embodiment shown in FIG. 7A). The plurality of spring-loaded arms 102 have an elastically deflectable portion 109 that collectively define an inner circumference large enough to accommodate holding feature 138. Each elastically deflectable portion 109 extends from planar support structure 109 so that elastically deflectable portion 109 positions suspension ledges 101 at the circumference c. Elastically deflectable portion 109 extends substantially orthogonally from planar support structure 109, and in some embodiments including the depicted embodiment extends generally perpendicularly. The tapering of suspension ledges 101 and holding feature 138 assist in the insertion and removal of cap 130 into and out of closure retaining structure 103, wherein once inserted no radial force is necessarily exerted upon cap 130. Each of the plurality of closure engaging structures 105 is arranged to engage with holding feature 138 on cover 136 of cap 130 using suspension ledges 101, thereby suspending cap 130 by holding feature 138, allowing cap 130 to be disposed within closure nest 100 substantially frictionlessly. There is no friction required to hold cap 130 suspended, and cap 130 thereby dangles from closure nest 100 as it is located and suspended within holding feature 138. By a suitable choice of dimensions of cap 130 and closure engaging structure 105, cap 130 may be suspended by its holding feature 138 wholly independent of friction, thus being substantially frictionlessly retaining the closure within the nest. We employ herein the term "friction-independent suspending" to describe the suspending of closure 120 by closure retaining structure 103 without any friction being required anywhere between cap 130 of closure 120 and any portion of closure retaining structure 103. Thus, this arrangement defines a volume within closure retaining structure 103 and closure engaging structures 105 that accommodates cap 130 including the outer circumference of holding feature 138 without resilient or biasing force necessarily being applied to cap 130 or holding feature 138. Each closure engaging structure 105 further comprises stop structure 104 against which cap 130 may push when cap 130 and closure nest 100 are pushed together vertically. Cap 130' of FIG. 6B may similarly be held by its specific holding feature 138'.

Figure 7B:
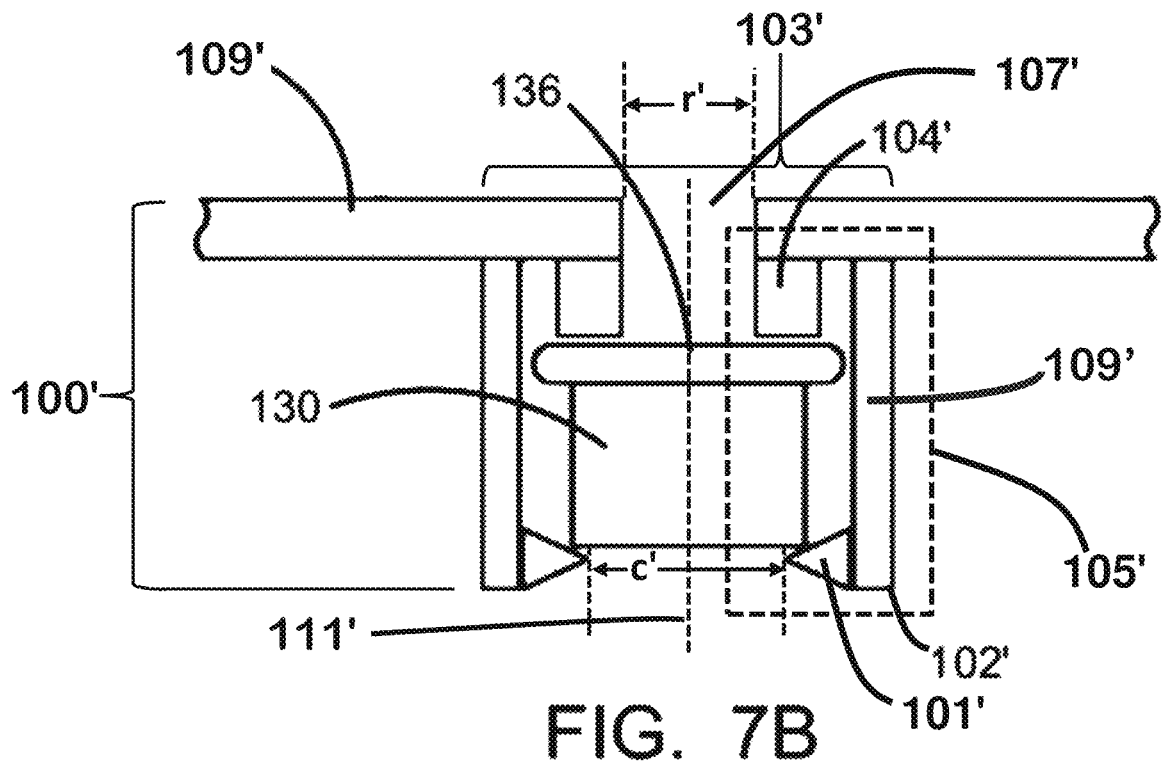

In FIG. 7B a planar support structure part of another closure nest 100' is shown schematically, depicting a closure retaining structure for single cap 130 of closure 120 of FIG. 6A. In FIG. 7B, associated stopper 140 is contained within cap 130 and is therefore not visible. It is to be understood that the part of closure nest 100' shown in FIG. 7B is descriptive of a plurality of such parts, and that the parts are arranged two dimensionally to concentrically align a plurality of containers 90 in container nest 70 center-to-center with a plurality of closures 120 held by closure nest 100'. The closure retaining structure comprises a spring-loaded retaining structure 105' comprising spring-loaded arm 102' and corresponding suspension ledge 101' (a triangle in the embodiment shown in FIG. 7B). The plurality of spring-loaded arms 102' each have elastically deflectable portion 109' that collectively define an inner circumference large enough to accommodate holding feature 138. Each elastically deflectable portion 109' extends from planar support structure 109' so that elastically deflectable portion 109' positions suspension ledges 101' at the circumference c'. Elastically deflectable portion 109' extends substantially orthogonally from planar support structure 109', and in some embodiments including the depicted embodiment extends generally perpendicularly. The tapering of suspension ledges 101' and holding feature 138 assist in the insertion and removal of cap 130 into and out of closure retaining structure 105', wherein once inserted no radial force is necessarily exerted upon cap 130. Spring-loaded retaining structure 102' is arranged to engage with the bottom of cap 130, using suspension ledge 101', thereby holding cap 130 vertically frictionlessly suspended and substantially frictionlessly retained in closure nest 100'. In this arrangement, the bottom of cap 130 therefore serves as generic holding feature, allowing cap 130 to be disposed within closure nest 100' substantially frictionlessly. Thus, this arrangement defines a volume within closure retaining structure 103' and closure engaging structures 105' that accommodates cap 130 without resilient or biasing force necessarily being applied to cap 130 or holding structure 138. The closure retaining structure further comprises stop structure 104' against which cap 130 may push when cap 130 and closure nest 100' are pushed together vertically. In general, the closure retaining structure may comprise an annularly arranged plurality of spring-loaded retaining structures 102'.

Closure engaging structures 105, 105' comprising spring-loaded arms 102, 102' and may be implemented in different ways. One non-limiting example of spring-loaded arm 102, 102' and elastically deflectable portion 109, 109' comprise an elastically flexible arm without any other biasing mechanism. Spring-loaded arm 102, 102' may be a separate structure from closure nest 100 that is fastened to closure nest 100 and may have a separate biasing mechanism. In other embodiments, spring-loaded arm 102, 102' and elastically deflectable portion 109, 109' are an integral part of closure nest 100 and may be manufactured to be monolithically integrated with closure nest 100. One non-limiting way of manufacturing spring-loaded arm 102, 102' as a monolithically integrated part of closure nest 100, is by injection molding of a suitable polymer.

Closure engaging structure 105, 105' holds cap 130, 130' (see FIG. 6B) in place during handling and transport, and may flex open without risk of removing the tamper evident cover 136, 136' when cap 130, 130' is being pushed or pulled out of the closure nest 100, 100'. The direction of the associated capping force may be upwards, downwards or both. Sections of closure nest 100, 100' may be reinforced by structural features such as honeycombs to distribute the capping force and to prevent bowing during handling. In preparing a closure nest as shown in FIG. 3, caps 130, 130' are pushed into corresponding closure engaging structures 105, 105' wherein the flexibility of suspension ledges 101, 101' and/or elastically deformable portions 109, 109' allows the movement of caps 130, 130' into the space defined within spring-loaded arms 102, 102' where caps 130, 130' may remain suspended without the application of any radial force. Similarly, after the closing shown and described below in relation to FIG. 8, closures 120, 120' may be pulled out of closure engaging structures 105, 105' by pulling of corresponding container 90 away from nest 100, 100' due to the inherent flexibility of suspension ledges 101, 101' and/or elastically deformable portions 109, 109'.

The integrity of container 90 and closure 120, 120' is achieved by deforming elastomeric stopper 140, 140' by compressing elastomeric stopper 140, 140' against container 90 and permanently holding it in this compressed state by cap 130, 130'. The radial compression of stopper 140, 140' by the interference fit inside of the neck of container 90, as indicated with diameter d 4 in FIG. 5B, may well create a seal, but that seal is generally considered no more than a secondary seal. In fact, some stopper designs for cap 130, 130' may go without any plug shape surrounding septum 142, 142'.

It is the vertical compression of the flange part of stopper 140, 140' against the top of container 90, on the area of container 90 indicated with diameters d 4 and d 2 in FIG. 5B, that creates the primary seal. Typically, a high residual sealing force is required to guarantee a robust container seal and provides a wide safety margin for changes in stopper 130, 130', such as compression set. The compression force required for final sealing has to be conveyed through top surface of cap 130, 130'. Therefore, an annular shape may be one non-limiting embodiment employed for stop structure 104, 104' to apply compression force to cap 130, 130' directly above the primary seal. Moreover, an annular shape for stop structure 104, 104' allows for removal of the capped container from closure nest 100 by insertion of a push rod (not shown) through opening 107, 107' in planar support structure 109, 109' of closure nest 100, 100'.

It has already been explained in the forgoing that the radial dimensions of container 90 and its corresponding cap 130 must ideally be equal or nearly equal in order to optimize the planar density of containers in container nest 70 and the planar density of corresponding closures in closure nest 100 of FIG. 7A. This leads to constraints on the diameters of opening 107 as compared with the radial separation of suspension ledges 101. The above planar density constraints force holding feature 138 to be narrow in radial extent. The inner diameter c of the annular arrangement of suspension ledges 101 approximates but is slightly less than the diameter of cover 136. Despite these limitations on the dimensions of the various parts of cap 130, strong enough stop structures 104 of finite radial dimensions are required in order to exert the closing force on cap 130 as already discussed. These sizeable stop structures 104 also have to be accommodated on closure nest 100 and located annularly below and around opening 107 so as to engage the top surface of cap 130. It follows that opening 107 in planar support structure 109 has a largest dimension r smaller than an inner diameter c of the annular arrangement of suspension ledges 101. On the same basis, opening 107' in planar support structure 109' of FIG. 7B has a largest dimension r' smaller than an inner diameter c' of the annular arrangement of suspension ledges 101'.

Different shapes may be employed for stop structures 104, 104', depending on the particular design of the cap. Stop structures 104, 104' also determine the length of spring-loaded arm 102, 102' and therefore its spring retention and opening force. Spring-loaded arm 102, 102' may be substantially linear and orthogonal to closure nest 100, 100', such as in the illustrated embodiment where there is a perpendicular arrangement. In yet other examples the height of stop structures 104, 104' and spring-loaded arm 102, 102' may be reduced by curling radially. In those cases where steam sterilization is required of the caps 130, 130' in the closure nest 100, 100', the contact area between stop structure 104, 104' and cap 130, 130' may be reduced to a series of point contacts to allow for good accessibility of steam.

Spring-loaded arm 102, 102' may be sized and shaped such that, when cap 130, 130' is secured on container 90, spring-loaded arm 102, 102' may be automatically pushed out of the way by container 90, thereby releasing cap 130, 130'. The close packing of closure retaining structures 103, 103' on closure nest 100, 100' implies that there is limited space for lateral motion of spring-loaded arm 102, 102'. For example, in a hexagonal close packed arrangement, each closure retaining structure 103, 103' is surrounded by six nearest neighbor closure retaining structures 103, 103' each requiring space for its spring-loaded arms 102, 102' to open in order to release corresponding cap 130, 130'. Each spring-loaded arm 102, 102' is sized and positioned to allow caps 130, 130' on neighboring closure retaining structures 103, 103' to be applied simultaneously to containers 90 correspondingly arranged in container nests 70.

In one embodiment, caps 130, 130' are each held by at least three annularly arranged spring-loaded arms 102, 102' in order to geometrically restrain each cap in its position. In general, each closure retaining structure on closure nest 100, 100' has a plurality of annularly arranged spring-loaded arms 102, 102'. In concept, there may be a single annular spring-loaded arm 102, 102' for each single closure retaining structure 103, 103' arranged to grip around the entire perimeter of cap 130, 130', or alternatively around a majority of the perimeter. The most general embodiment of closure nest 100, 100' therefore has at least one spring-loaded arm 102, 102' for each closure retaining structure 103, 103'.

In operation, a plurality of closures 120, 120' is releasably retained in closure nest 100, 100' through being friction-independent suspended by closure engaging structures 105, 105' being engaged with holding features 138, 138' of closures 120, 120', the closure bottoms being a kind of holding feature. To engage closures 120, 120' in this fashion, closures 120, 120' may be pushed into closure retaining structures 103, 103' during which action spring-loaded arms 102, 102' are elastically displaced by caps 130, 130' of closures 120, 120' until suspension ledges 101, 101' click into position on holding features 138, 138'. The closures are then supplied to the filling process in this configuration.

While the closure engaging structures 105, 105' offer initial frictional resistance via a lateral force when closures are pushed into closure retaining structures 103, 103' as part of the process of populating closure nests with closures, the subsequent retention of the closures is independent of any lateral, friction-inducing force orthogonal to the axial direction of movement of closures into a nested condition. Suspension ledges 101, 101' of spring-loaded arms 102, 102' function as barriers to the downward movement of closures, resulting in the closure in each closure-container combination hanging suspended with the closures retained within closure engaging structures 105, 105'.

Figure 8:
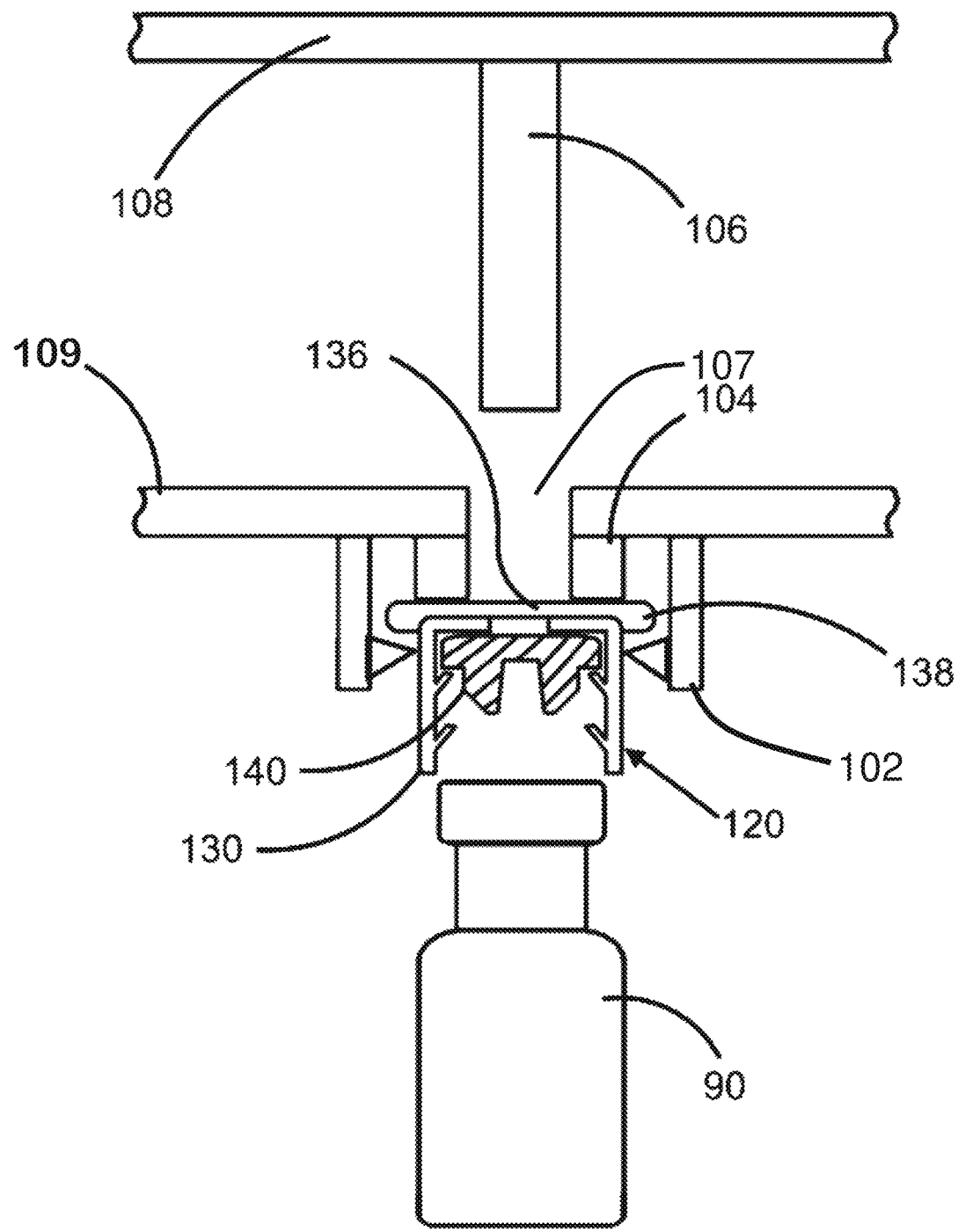
FIG. 8 shows an arrangement for closing the container of FIG. 5 with the closure of FIG. 6A using the closure retaining structures of FIG. 7A.

FIG. 8 shows the configuration for the closing of a single container 90, being one of a plurality of containers held in container nest 70 of FIGS. 1, 2 and 4. For closing, closure 120, being one of a corresponding plurality of closures 120 releasably retained by closure nest 100, is concentrically aligned with container 90 by virtue of the geometries of nests 70 and 100 corresponding center-to-center with each other in two dimensions. The closure holding structure is that of FIG. 7A and the closure detail is that of FIG. 6A, with a limited number of elements of closure 120 labeled for clarity. When elements are not numbered, the numbers of FIG. 6A pertain.

During the closing of container 90 with closure 120, container 90 and closure 120 are vertically forced together. This may be done to a degree that merely causes the top of container 90 to engage with barbed retention features 134 (See FIG. 6A). This constitutes partial closing. The application of further force pushes stopper 140 via stop structures 104 deeper into container 90 to seal it. In a final step, container 90, duly capped and closed with closure 120, may in one embodiment be disengaged from closure retaining structure 103 of closure nest 100 by pushing downward on cover 136 of cap 130 on closure 120 with rod 106 attached to platen 108. Platen 108 may extend over the whole surface of closure nest 100 or may extend over part of it. There may be the same number of rods 106 as the number of closures held by closure nest 100, or rods 106 may be fewer. This action forces open the spring-loaded arms 102, 102' and releases capped container 90 from the closure retaining structure of closure nest 100. This process or method may be conducted simultaneously for a plurality of closure retaining structures of closure nest 100. All the closures in all the closure retaining structures of closure nest 100 may undergo this procedure simultaneously.

In a most general description, this specification provides closure nest 100, 100' for releasably retaining a plurality of closures 120, 120' for pharmaceutical containers, closure nest 100, 100' comprising a plurality of closure retaining structures 103, 103' each comprising at least one closure engaging structure 105, 105'. The at least one closure engaging structure comprises spring-loaded arm 102, 102' and stop structure 104, 104'. The spring-loaded arm 102, 102' is configured to engage with holding feature 138, 138' on one of the plurality of closures 120, 120' and stop structure 104, 104' is configured to confine the one of the plurality of closures 120, 120' and exert force on the one of the plurality of closures when the closures and the closure nest are pushed together vertically. The closure engaging structures may be arranged in a geometric pattern, which geometric pattern may be a close packed pattern and which may match center-to-center a corresponding pattern of container-holding structures in a container nest. Spring-loaded arm 102, 102' may be a flexible structure and may be manufactured from a polymer. Spring-loaded arm 102, 102' may be monolithically integrated with closure nest 100, 100'.

Associated with closure nest 100, 100', a method for holding a plurality of closures 120, 120' comprises releasably retaining each closure 120, 120' by releasably suspending each closure 120, 120' by holding feature 138, 138' on closure 120, 120', the holding feature being a specifically designed holding feature 138, 138' or the bottom of a closure as in FIG. 7B. The releasably suspending may be friction-independent suspending. The releasably suspending may be spring-loaded retaining, which is achieved by flexibly deforming or spring-wise deforming a spring-loaded arm 102, 102'. The term "spring-loaded" is used in this specification to describe any form of spring loading, whether by mechanical spring or by a flexible member, or by any other means that will produce a suitable spring or elastic action.

The method provided here for aseptically sealing a pharmaceutical product into a plurality of containers comprises: introducing a first plurality of containers into a controlled environment enclosure; releasably suspending from a closure nest in the controlled environment a plurality of aseptic closures; filling at least a first portion of the first plurality of containers with the pharmaceutical product; and simultaneously sealing at least partially a second portion of the first plurality of containers with a portion of the plurality of aseptic closures while releasably retaining the aseptic closures in the closure nest. The method may further comprise lyophilizing the pharmaceutical product in the second portion of the first plurality of containers while releasably retaining the aseptic closures in the closure nest.

The releasably suspending may be friction-independent suspending.

The releasably suspending and releasably retaining may comprise releasably engaging with a holding feature of each of the plurality of aseptic closures. The releasably engaging with the holding feature may comprise elastically engaging with the holding feature. The elastically engaging with the holding feature may comprise engaging the holding feature with a spring-loaded arm portion of the closure nest.

Some or all of the plurality of the aseptic closures retained by the closure nest may be used to either fully or partially seal the pharmaceutical product into the containers. The plurality of containers may be equal in number to the number of aseptic closures releasably suspended by the closure nest. Two or more containers may be filled simultaneously.

As regards benefits, closure nest 100, 100', with its spring-loaded arm 102, 102' and stop structures 104, 104' described in this specification, lends itself to the simultaneous capping and stoppering, both partially and completely, of pluralities of containers 90. More specifically, it lends itself to the simultaneous capping, both partially and completely, of rows of containers 90. Yet more specifically, it lends itself to the simultaneous capping, both partially and completely, of complete two-dimensional arrays of containers 90 in container nests 70. There is no direct contact between closure nest 100, 100' and any parts that will contact the pharmaceutical product. All handling of closures 120, 120' by the articulated arm apparatus 22 is by means of closure nest 100, 100'. All contact with the closure nest 100, 100' within the aseptic environment of controlled environment enclosure 20 is by means of devices and surfaces that may be sterilized. As is evident from FIGS. 6A, 6B, 7A, 7B and 8, all portions of each of the plurality of closure retaining structures 103, 103' are disposed to remain out of contact with stopper 142, 142' of a corresponding closure 120, 120' when the corresponding closure 120, 120' is engaged by the at least one closure engaging structure 105, 105'.

The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. As used in this disclosure, except where the context requires otherwise, the term "comprise" and variations of the term, such as "comprising", "comprises" and "comprised" are not intended to exclude other additives, components, integers or steps.

Also, it is noted that the embodiments are disclosed as a process that is depicted as a flowchart, a flow diagram, a structure diagram, or a block diagram. Although a flowchart may disclose various steps of the operations as a sequential process, many of the operations can be performed in parallel or concurrently. The steps shown are not intended to be limiting nor are they intended to indicate that each step depicted is essential to the method, but instead are exemplary steps only. In the foregoing specification, the invention has been described with reference to specific embodiments thereof. It will, however, be evident that various modifications and changes may be made thereto without departing from the broader spirit and scope of the invention. The specification and drawing are, accordingly, to be regarded in an illustrative rather than a restrictive sense. It should be appreciated that the present invention should not be construed as limited by such embodiments.

From the foregoing description it will be apparent that the present invention has a number of advantages, some of which have been described herein, and others of which are inherent in the embodiments of the invention described or claimed herein. Also, it will be understood that modifications can be made to the device, apparatus and method described herein without departing from the teachings of subject matter described herein. As such, the invention is not to be limited to the described embodiments except as required by the appended claims.

The invention claimed is:

1. A closure nest for releasably retaining a plurality of pharmaceutical container closures wherein each closure comprises a stopper retained within a cylindrical cap having a radially extending exterior holding feature, the closure nest comprising:
    a plurality of closure retaining structures arranged on a planar support structure to spatially correspond with a plurality of pharmaceutical containers in a container nest,
    wherein each closure retaining structure comprises closure engaging structures disposed annularly about a cylindrical axis of a corresponding closure and arranged for suspending the corresponding closure by a holding feature of a corresponding cap,
    wherein each of the closure engaging structures comprises a spring-loaded arm extending substantially orthogonally from the planar support structure and a triangular suspension ledge extending toward a cylindrical axis of the corresponding closure,
    wherein the triangular suspension ledges of the closure engaging structures corresponding to each of the plurality of closure retaining structures form an annular arrangement,
    wherein the planar support structure comprises a plurality of openings corresponding to the plurality of closure retaining structures and wherein each opening has a largest dimension smaller than an inner diameter of the annular arrangement of suspension ledges, and
    wherein each of the closure engaging structures comprises a stop structure extending substantially orthogonally from the planar support structure for engaging a portion of a top surface of the closure cap.

2. The closure nest of claim 1, wherein the closure retaining structures are arranged in a geometric pattern.

3. The closure nest of claim 1, wherein the closure retaining structures are arranged in a hexagonal close packed pattern.

4. The closure nest of claim 1, wherein the spring-loaded arm of each closure engaging structure is elastically deformable spring-loaded arm.

5. The closure nest of claim 1, wherein the spring-loaded arm of each closure engaging structure is an elastically flexible spring-loaded arm.

6. The closure nest of claim 1, wherein the spring-loaded arm of each closure engaging structure is polymeric.

7. The closure nest of claim 1, wherein the spring-loaded arm of each closure engaging structure is monolithically integrated with the planar support structure.

8. The closure nest of claim 1, wherein the stop structure of each of the at least one closure engaging structures is monolithically integrated with the planar support structure.

9. The closure nest of claim 1, wherein for each of the plurality of closure retaining structures every closure engaging structure of the closure retaining structure shares with all of the other of the closure engaging structures of the closure retaining structure a single stop structure annularly arranged about the cylindrical axis of the corresponding closure.

10. The closure nest of claim 9, wherein the stop structure comprises a plurality of point contacts.

11. The closure nest of claim 1, wherein the closure retaining structures comprise at least three closure engaging structures disposed annularly about the cylindrical axis of the corresponding closure.

12. The closure nest of claim 1, wherein all portions of each of the closure retaining structures are disposed to remain out of contact with the stopper of a corresponding closure when the corresponding closure is engaged by the closure engaging structure of each of the plurality of closure retaining structures.

13. A closure nest for releasably retaining a plurality of pharmaceutical container closures wherein each closure comprises a stopper retained within a cylindrical cap having a radially extending exterior holding feature, the closure nest comprising:
    a plurality of closure retaining structures arranged on a planar support structure to spatially correspond with a plurality of pharmaceutical containers in a container nest,
    wherein each closure retaining structure comprises closure engaging structures disposed annularly about a cylindrical axis of a corresponding closure and arranged for suspending the corresponding closure on a holding feature of a corresponding cap,
    wherein each of the closure engaging structures comprises a spring-loaded arm extending substantially orthogonally from the planar support structure and a suspension ledge extending toward a cylindrical axis of the corresponding closure,
    wherein the suspension ledges of the closure engaging structures corresponding to each of the plurality of closure retaining structures form an annular arrangement,
    wherein the planar support structure comprises a plurality of openings corresponding to the plurality of closure retaining structures and wherein each opening has a largest dimension smaller than an inner diameter of the annular arrangement of suspension ledges, and
    wherein each of the closure engaging structures comprises a stop structure extending substantially orthogonally from the planar support structure for engaging a portion of a top surface of the closure cap.

* * * * *